United States Patent [19]

Craft

[11] 3,818,447

[45] June 18, 1974

[54] PRIORITY DATA HANDLING SYSTEM AND METHOD

[75] Inventor: David John Craft, Chandlers Ford, England

[73] Assignee: International Business Machines Corporation, Armonk, N.Y.

[22] Filed: Mar. 16, 1973

[21] Appl. No.: 342,239

[30] Foreign Application Priority Data

Apr. 21, 1972 Great Britain .................... 18552/72

[52] U.S. Cl. ......................... 340/147 LP, 340/172.5

[51] Int. Cl. ............................................. H04q 9/00

[58] Field of Search .................. 340/147 R, 147 LP; 179/15 A

[56] References Cited

UNITED STATES PATENTS

| | | | |
|---|---|---|---|
| 3,445,822 | 7/1967 | Driscoll | 340/172.5 |
| 3,480,914 | 11/1969 | Schlaeppi | 340/172.5 |
| 3,485,953 | 12/1969 | Norberg | 340/147 R |
| 3,593,300 | 7/1971 | Driscoll | 340/172.5 |
| 3,665,398 | 5/1972 | Kawai et al. | 340/147 R |

FOREIGN PATENTS OR APPLICATIONS

| | | |
|---|---|---|
| 1,168,476 | 10/1969 | Great Britain |

*Primary Examiner*—Donald J. Yusko
*Attorney, Agent, or Firm*—Edward H. Duffield

[57] ABSTRACT

An access control system and method is disclosed in which a plurality of communication stations contend for access to a communications channel. Each remote station is provided with a priority access number and with a means for comparing its number with those of any contending stations then requesting access to the communication channel to determine which station will be given first access thereto.

12 Claims, 6 Drawing Figures

INTERRUPT FRAME IN WHICH A MODULE IS SELECTED AND ITS INTERRUPT NUMBER IS TRANSMITTED TO THE CONTROLLER

PRIORITY DATA HANDLING SYSTEM AND METHOD

PRIORITY

This application claims priority under 35 USC 119 based on an application first filed in England as Pat. Ser. No. 0018552/72, filed Apr. 21, 1972, by the same inventors hereof and assigned to the common assignee herewith.

FIELD OF THE INVENTION

This invention relates to data handling systems in general and in particular to systems in which a number of data handling devices are in communication with a common controller, any one or more of which devices may require service from the controller at any one time. It provides the facility for programmable interrupt priority allocation on serial interfaces in general and in loop type communications systems in particular.

PRIOR ART

In systems of the type noted above, conflicts can occur when two (or more) devices require the service of the controller simultaneously. Arrangements have been proposed for dealing with such conflicts which vary in complexity from simple fixed priority systems to full scale programmable interrupt systems.

In a simple fixed priority system, each device is given a position in a list or queue which enables the central station or controller to determine whether that particular device should be serviced before or after any other device seeking access. The listing cannot be changed and, although the system has the virtue of simplicity, it is inflexible. On the other hand, with a sophisticated interrupt handling system, a request for access by any device causes a routine to be entered in the controller which involves the recovery of data pertaining both to that device and to other devices seeking access, which data will include information as to the current relative priorities of the various devices in the system. Such data is changeable under program control and the system is accordingly highly flexible. However, the implementation of such an interrupt handling system is expensive and not normally compatible with a smaller data handling system such as that using a serial interface of the type described in our commonly assigned copending U.K. Pat. application Ser. No. 44777/71.

OBJECTS OF THE INVENTION

It is an object of the present invention to provide a data handling method and system which permits conflicts for access among communications devices connected to a communication channel to be resolved by the devices themselves and which is particularly convenient to implement in a serial interface system.

SUMMARY

According to the invention there is provided a data handling system comprising a number of data handling devices or remote stations, each arranged to communicate with a common controller on an interrupt basis by issuing requests for access thereto on a common interface or communications channel therewith. Each data handling device has an assigned interrupt number and includes means, effective when issuing a request for access, for comparing such number with other interrupt numbers presented to said interface in connection with conflicting requests for access by other data handling devices in said system. Each device also includes means for proceeding with, or abandoning such request according to the result of such comparison.

BRIEF DESCRIPTION OF THE DRAWING

In order that the invention may be fully understood, a preferred embodiment thereof will now be described with reference to the accompanying drawing, in which:

FIG. 1 shows in block diagram form a data handling system comprising a controller or central station 1 arranged to communicate over a serial interface or data bus 2 with a number of input/output devices 3 each of which is attached to the interface by way of an attachment module 4. Data bus 2 can also be generalized as a communications channel, as it is usually described in the art. The controller 1 is a parallel machine in the sense that it delivers and receives data in the form of multi-bit groups over a number of parallel lines 5, and is accordingly connected to the interface which is serial in character by way of an interface adapter 6, of a type well-known in the art, which performs all necessary timing serializing-deserializing and level changing functions.

Figure 1:
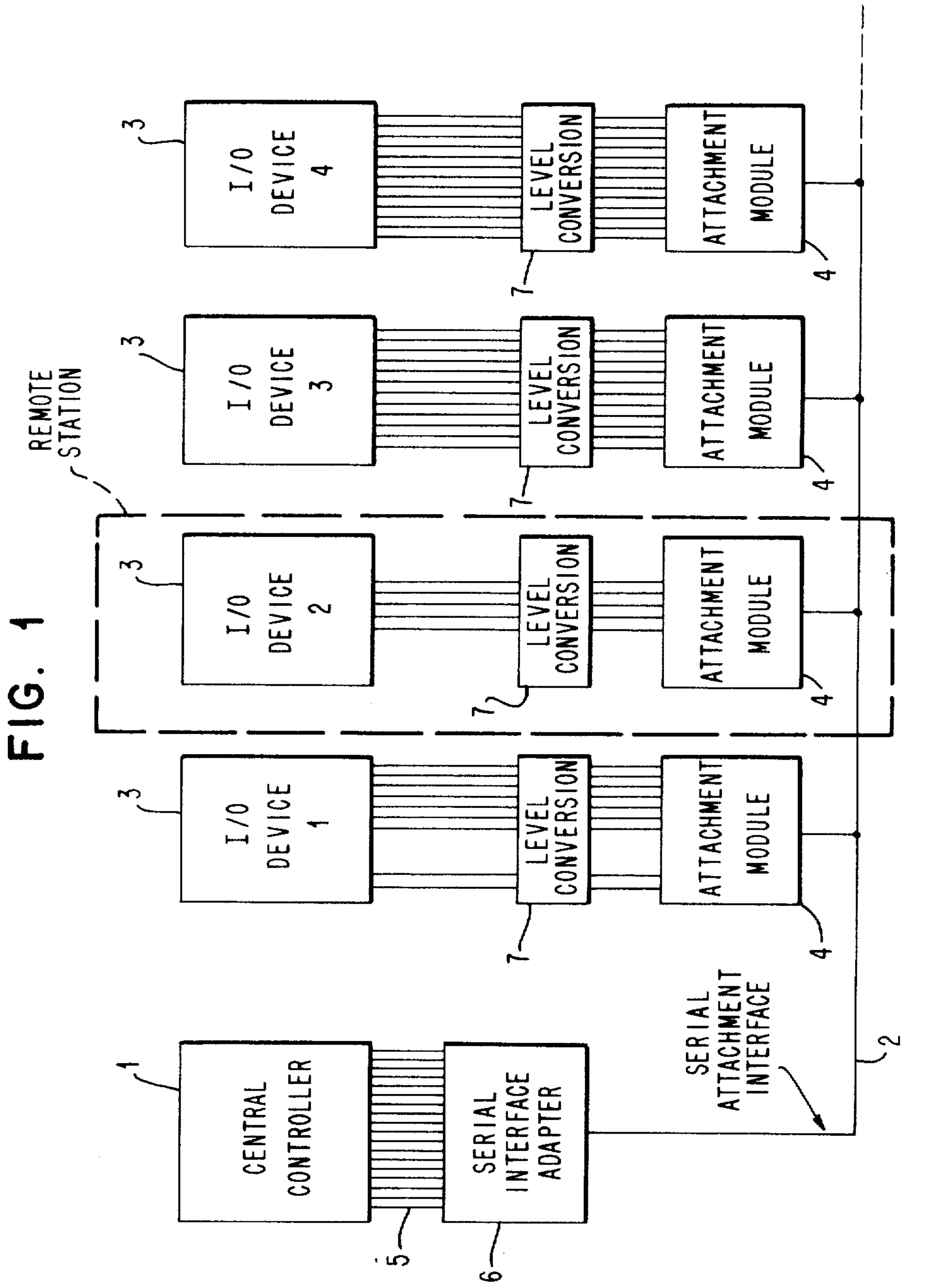
FIG. 1 shows a system embodying the invention.
Figure 2:
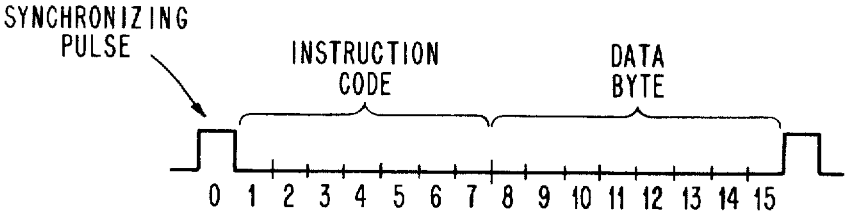
FIG. 2 is a timing diagram showing the manner in which instructions and data are transmitted on the serial interface of FIG. 1.

All of the attachment modules 4 are identical, their structure being of the same general type as that described in our commonly assigned copending application U.K. Pat. No. 44777/71. This structure forms no part of the present invention and will not be described in detail herein. It is sufficient to note at this point that the only adaptation required between an attachment module 4 and the associated I/O device 3 is the adjustment of signal levels to suit the I/O device in question. This function is performed by a level converter 7.

In operation, each attachment module 4 is capable of independently controlling its associated I/O device 3 to a limited extent but requires periodically to communicate with the controller 1 for the continued performance of its assigned tasks. The combination of a module 4 with an adapter 6 and a device 3 is also termed a "remote station" for the purpose of this application. During such periods of communication there is an exchange of status and/or data and/or control information. To initiate such an exchange, an attachment module 4 presents an interrupt request to the controller 1. Since the controller 1 may only service one remote station attachment module 4 at a time and since several modules may simultaneously request service, and further since the modules share a common serial interface, a selection scheme of some sort is clearly necessary. Further, in such a conflicting situation, the controller 1 needs to know when servicing a request the identity of the requesting (station) module 4 selected for service. This is necessary firstly for the controller 1 to determine the appropriate action and secondly to determine where to send information resulting from the action.

Figure 3:
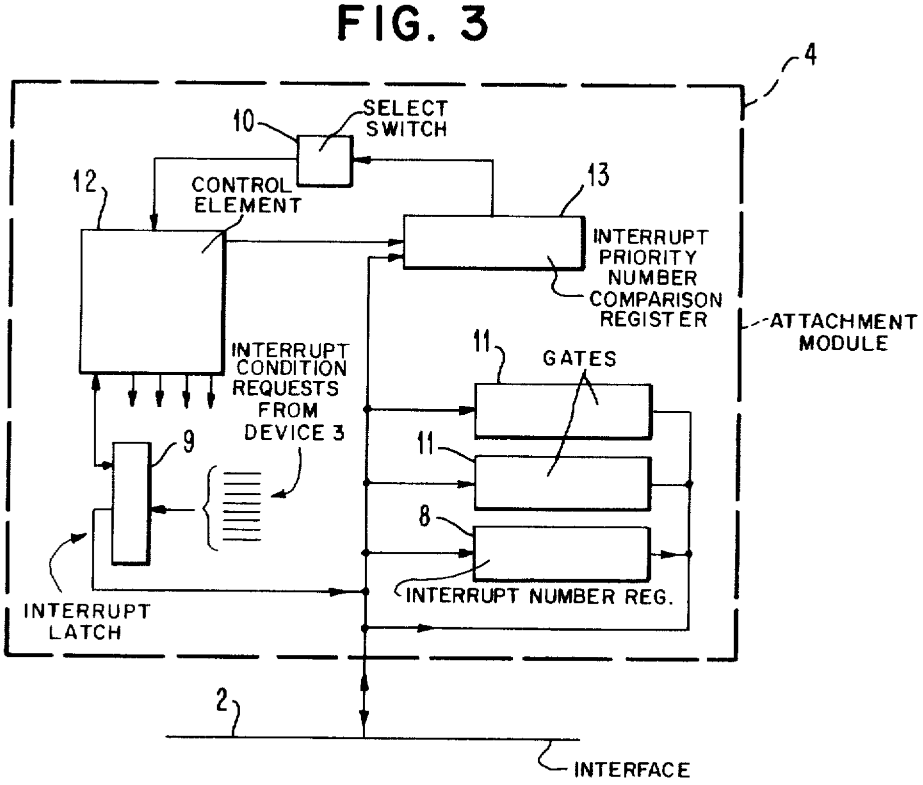
FIG. 3 shows those parts of an attachment module used in processing interrupt requests and FIG. 3A is a timing diagram showing the manner in which interrupt numbers are sent over the serial interface.

As described in detail in our commonly assigned copending Pat. application No. 44777/71, each attachment module contains three basic elements. Referring to FIG. 3, one of these, a control element 12, is arranged to regulate the operation of the module 4 in response to applied instructions from the controller 1 and to request service for the associated input/output device 3. It does this primarily by controlling the opening and closing of gates 11 in the module 4 to regulate the flow of information to and from the other elements which are a storage element comprising a number of registers and a timing and sequencing element which can be set from the controller to determine the timing of particular input/output operations. One specific operation that the module 4 can perform is the comparison of information held in one of the registers with information being sent on the interface 2 by the controller 1. This operation is used to enable each module 4 to determine whether or not an instruction on the interface 2 is destined for this or another module 4 by comparing address data on the interface 2 with its own address held in one of the registers.

When a system is first established none of the attachment modules 4 includes any stored data and the first function of the controller 1 is to load one of the registers in each module with data identifying that module uniquely so that future communication with that module can be carried out by specifying this identity. In the present embodiment, this identity is assumed to be held in a register 13 which is arranged to compare data arriving from the bus 2 with its own contents when instructed to do so by the control element 12. A successful comparison energizes a latch 10 as described later. As will become apparent also from the subsequent description in the present embodiment, the identity of each attachment module 4 is uniquely defined by a number called the interrupt number which is accordingly the number entered into register 13. However, in other situations it may happen that the identity of the module 4 and the interrupt number are different, in which case the interrupt number is held in another register in the module.

In the embodiment of the invention shown in FIG. 1, one of the registers in each module 4 is arranged to function as an interrupt register. This register, referenced 8 in FIG. 3, is arranged to be loaded by the controller 1 after power is first applied to the system with a number called an "interrupt number."

Unique interrupt numbers are provided for each remote station attachment module 4 in the system since this number is to represent both the module (station) identity and its relative interrupt priority. The interrupt number register 8 is 14 bits long, numbered 2 through 15, and each attachement module 4 is arranged to drive the contents of its register serially onto the data bus 2 at bit times in the message frame corresponding to the bit numbers in the register.

In addition to the interrupt number register 8, each attachment module contains an interrupt latch 9 and a select latch 10. The interrupt latch 9 is set by any condition arising which requires that the attachment module 4 should attempt to interrupt the controller 1. The select latch 10 is used to determine which attachment module 4 responds to instructions transmitted along the serial attachment interface 2.

Figure 3A:
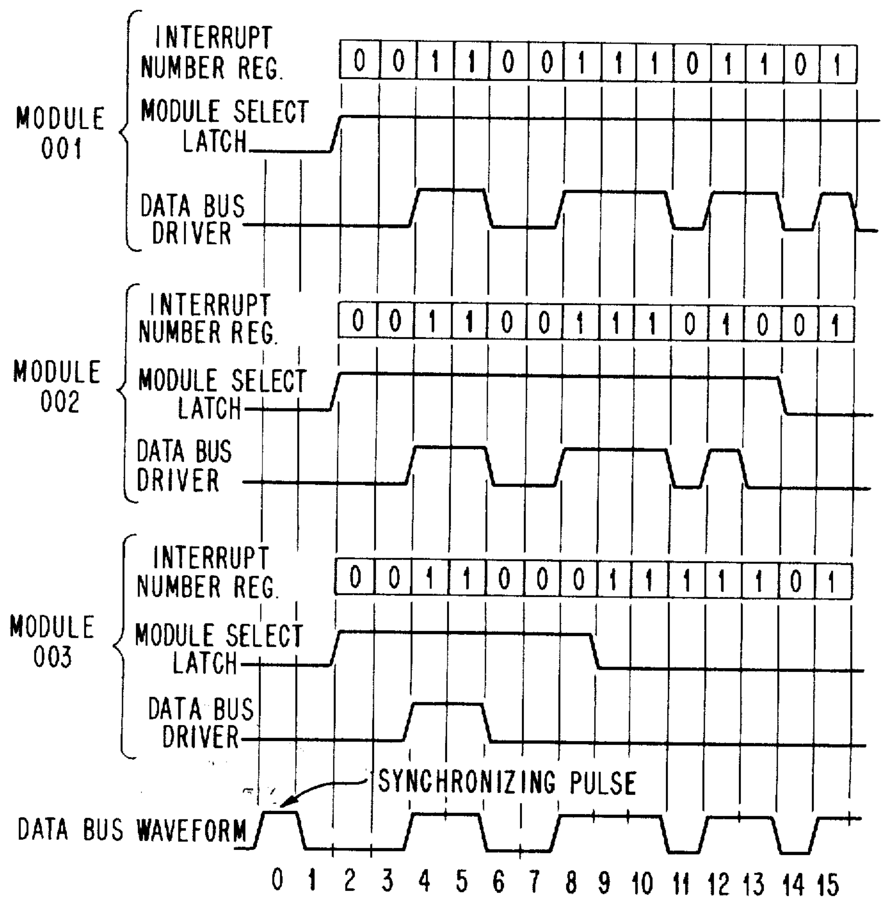

In operation, all attachment modules 4 are arranged to monitor bit position 1 in each message frame appearing on the channel. As soon as a "0" appears in this bit position (signifying that the controller 1 has stopped issuing instructions on the interface and can therefore be interrupted) all modules 4 requiring to interrupt the controller 1 turn on their select latches 10. These modules then commence driving out the contents of their interrupt number registers 8 serially on the data bus 2, simultaneously comparing each binary signal appearing on the bus 2 with the corresponding bit in its interrupt register 8. Any module 4 which finds that the state of the bus 2 is a "1" and the corresponding bit of its own interrupt number register (which it has just been driving onto the bus) is a "0" immediately resets its select latch 10 and participates no further in the selection process. At the end of bit time 15 (provided the interrupt number registers all hold unique numbers) only a single select latch 10, that in the module 4 having the highest value interrupt number, will be left on. In addition, the bit pattern appearing on the data bus 2 in bit times 2 to 15 will be identical with the interrupt number of the module finally left selected. This pattern is read into a register in the interface adapter 6, so that as the selection process occurs a number is transmitted to the controller 1 which can be used to identify the highest priority interrupting module 4. FIG. 3A shows in detail this selection process for a situation in which three modules attempt to interrupt the controller and one (module 003) is finally left selected.

In the embodiment described above, the controller 1 cannot distinguish between the case when no module is interrupting and that when a single module is interrupting with an all-zero interrupt number. An all-zero interrupt number must therefore not be allowed, and the system is thus able to distinguish and select from a maximum of $(2^{14})-1$ interrupt numbers. When instructions are being issued to an already selected module, bit time 1 is always occupied by a 1 so that no further modules can become selected even though their interrupt latches 9 may be set.

Clearly once the controller 1 has transmitted an instruction to a selected module 4 in order to obtain its interrupt status, the interrupt latch 9 of that module can be automatically reset.

It may be desirable for attachment modules to be able to be selected on the basis of more than one level of priority. The scheme described allows this to be done, the most general way being to provide several interrupt number registers in each attachment module. Thus, if it is desired to present a high or a low priority interrupt, for example, then each attachment module would contain high and low interrupt priority latches which would determine whether the high or low priority interrupt number registers should be driven out onto the data bus during the selection process. This system allows two perfectly independent selection priorities to be established.

Alternatively, it is possible to save circuitry by arranging for part of the interrupt number register to be common to all request priorities. Thus, each module could drive out a "1" or a "0" during bit time 2 of the frame according to whether the priority was high or low, followed by the contents of a common 13-bit interrupt number register during bit times 3 to 15. Although this approach allows the implementation of a 2-level selection scheme with little more circuitry than that required for a single-level scheme, it is restricted in that the low level priority order is necessarily the same as the high. Multilevel arrangements between the two extremes are possible. For the 2-level priority schemes the maximum number of modules which may be attached is now $(2^{13})-1$ and the controller must be programmed to identify each module by one of two possible interrupt numbers.

Figure 4:
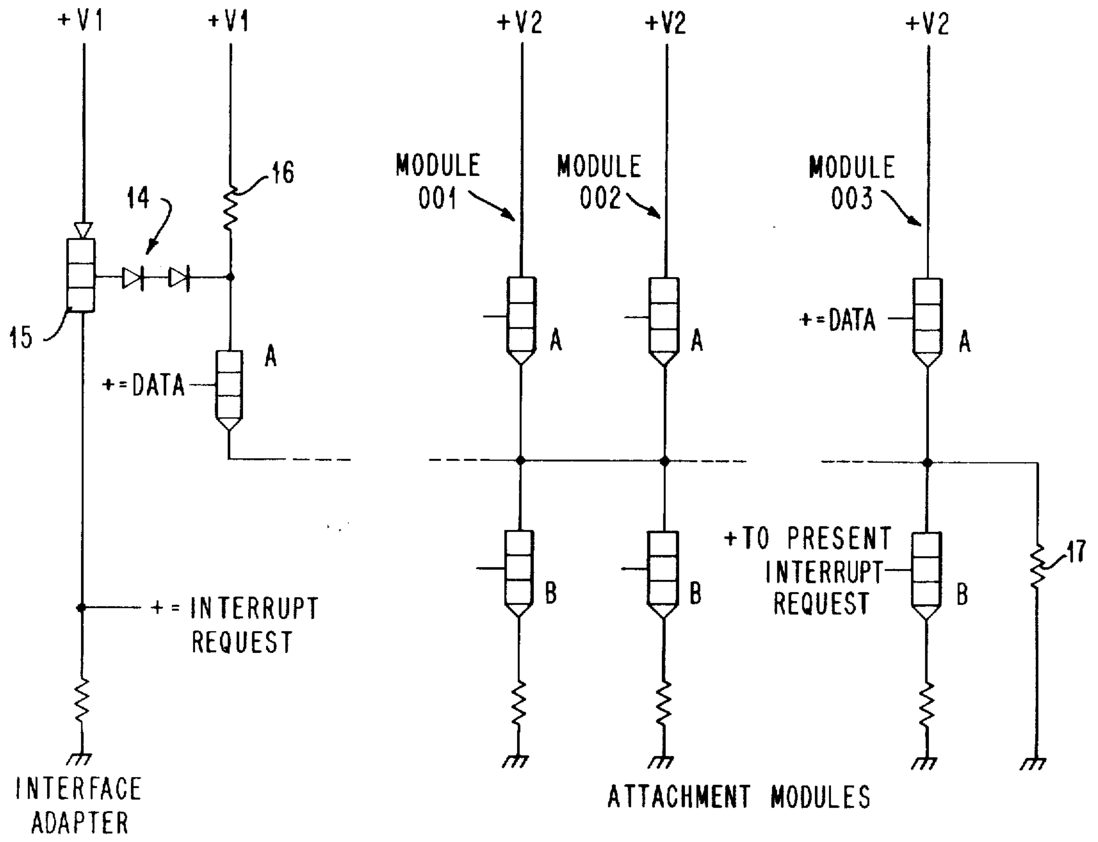
FIG. 4 shows driver circuits used in an alternative system to that of FIG. 1.
Figure 5:
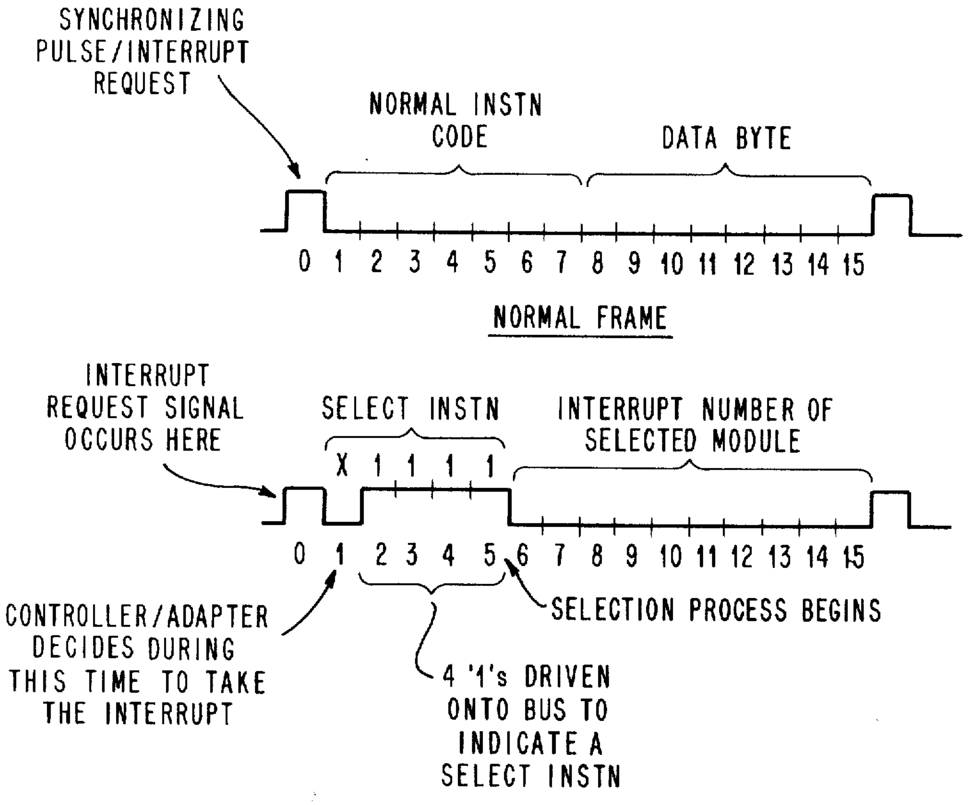
FIG. 5 is a timing diagram showing an alternative module selection scheme.

As has been pointed out in the embodiment described, bit time 1 is reserved for informing each attachment module in every time frame whether or not an interrupt is allowable. By the use of more complex driver circuits in the attachment module, it is possible to signal the interrupt request in the same bit time as the synchronizing bit is transmitted. The controller 1 may now optionally initiate the selection process by issuing an instruction code reserved for the purpose. FIG. 4 shows the type of driver circuit required and FIG. 5 shows a typical example of a frame organization for such a system.

Referring to FIG. 4, the interface adapter 6 is now provided with a current sensing circuit 14 for monitoring current levels on the interface 2. This circuit includes a transistor 15 having its base connected to respond to the voltage drop across a resistor 16 due to current flowing in the interface 2. Further, each attachment module 4 is now provided with two driver circuits A and B which may be selectively energized as described below. The interface is terminated by a resistor 17.

For normal driving of a "1" onto the bus 2, only the "A" circuits are activated, the bus being restored to the O level by the terminating resistor 17. The synchronizing bit is thus transmitted by the interface adapter 6 turning on its "A" circuit to lift the bus 2 up to the "1" level. During this bit time, however, any attachment module that is currently awaiting service also turns on its "B" circuit. The voltage on the bus 2 still ends up at the "1" level, but the current sensing device 14 associated with the adapter driving circuit detects the extra current that is required to flow down through the "B" device(s) and signals to the controller 1 that an interrupt request has been presented. Bit times 1 to 7 are now available for instruction codes giving a maximum of 128 instructions as against 64 for the previously described embodiment. In the example shown in FIG. 5, this number has been reduced to 120 by specifying the select instruction code as a synchronizing bit followed by X1111. This is done for two reasons. Firstly, the interrupt request signal is only available at the interface adapter at the end of bit time 0, which may not be in time to easily influence the data transmitted by the controller during bit time 1. By making bit time 1 an "X" for the select instruction the whole of this bit time is available for the hardware in the controller/adapter to decide whether or not to carry on with the current interface instruction or to take the interrupt by issuing a select instruction. Secondly, by making the total instruction code for the select instruction only occupy bits 1 through 5, the remaining 10 bits are available for the selection process, as against eight bits if a full length instruction code were specified. Note also that this system is able to use an all-zero interrupt number since the presence or absence of an interrupt is signalled independently of the selection process.

While the invention has been particularly shown and described with reference to a preferred embodiment thereof, it will be understood by those of skill in the art that various changes in form and detail may be made therein without departing from the spirit and scope of the invention.

What is claimed is:

1. A method of determining communications access priority in a multiple station contention mode system in which a plurality of stations are connected by a common communications channel to a central station in a loop or in a full duplex arrangement, said method comprising the steps of:

assigning to each said station a unique number;

simultaneously presenting said numbers by transmitting them to said channel at each station requiring access priority to said channel;

comparing, with comparison means provided at each said station, said assigned number with any other such numbers appearing on said channel when said station requires access to said channel;

establishing communication with said central station or abandoning the request for access thereto depending upon the results of said comparing step;

soliciting priority access requests from said stations by issuing serially by bit on said channel a predetermined coded frame from said central station, to which any said station requiring access to said channel is adapted to respond;

said presenting step being performed by entering from each said station requiring access to said channel into each bit position in said coded frame a corresponding bit from said station's assigned number; and said comparing step comprises comparing said corresponding bit with the content of that bit position received from said channel after all requesting stations have entered their said associated bits.

2. A method as described in claim 1, wherein:

said comparing step is carried out until a lack of correspondence at any said station between bits for any said bit position is detected to terminate the access request for said station and for permitting access in the event that no lack of correspondence is detected before the last bit of said frame is compared.

3. A method as described in claim 2, wherein:

said comparison is conducted using binary numbers and access is granted to the last said station having a binary one in the said bit position of its said number then being compared when a binary zero appears on said channel in said bit position in said frame for comparison.

4. A method as described in claim 1, wherein:

said assigning step comprises assigning to each said station a plurality of said unique numbers, each said number for each station representing a different level of priority selectable by said station for use in said comparison step; and further including a step of selecting by said station desiring access to said channel which of said numbers will be presented for comparison according to the level of priority desired.

5. A data handling system comprising:

a plurality of data handling devices, each said device being connectable via a communications channel for communication with a common controller on an interrupt basis by issuing a request for access thereto on the communications channel;

each said data handling device having an assigned interrupt number and also having means, effective when issuing a said request for access, for comparing said number with said other interrupt numbers presented on said channel in connection with conflicting requests for access by other data handling devices in said system and for proceeding with, or abandoning such request according to the result of such comparison;

said data handling devices being connected to a common data bus which is connected at one end to said controller and which serves as said communications channel;

each said data handling device being adapted to signal an interrupt condition to said controller by changing the DC voltage conditions on said commmon data bus; and said controller is adapted to solicit interrupt requests by issuing, serially by bit on said data bus, a predetermined coded frame to which any data handling device requiring access is adapted to respond by entering into each bit position in said frame a corresponding bit from its assigned interrupt number, followed by comparing said corresponding bit with the contents of that bit position after all requesting devices have entered their associated bits, and terminating or continuing said request for access according to the result of said comparison as determined by said comparing means.

6. A system as claimed in claim 5, in which:

each said data handling device includes an interrupt register adapted to contain the assigned interrupt number, and a select latch settable in response to said predetermined frame, said interrupt register being operable to drive its contents serially onto said bus in response to the set condition of said select latch, and said select latch being reset in response to a comparison result indicating that the currently compared bit of the assigned interrupt number is binary zero while the corresponding bit on said bus is binary one, thereby terminating the access request of the associated device.

7. A system as claimed in claim 5, in which:

each said data handling device includes two interrupt registers, one or the other register being selectable according to the occurrence of a high or low priority interrupt request within the device.

8. A system as claimed in claim 6, in which:

said interrupt register includes two sections, one being selectable according to the occurrence of a high or low priority interrupt request within the device, the other being common to both classes of request.

9. A system as claimed in claim 5 in which:

interrupt numbers are uniquely associated with said devices and said controller is arranged to respond to the number remaining on said bus at the end of said predetermined frame to select the associated device for processing of its interrupt request.

10. A system as claimed in claim 6, in which:

interrupt numbers are uniquely associated with said devices and said controller is arranged to respond to the number remaining on said bus at the end of said predetermined frame to select the associated device for processing of its interrupt request.

11. A system as claimed in claim 7, in which:

interrupt numbers are uniquely associated with said devices and said controller is arranged to respond to the number remaining on said bus at the end of said predetermined frame to select the associated device for processing of its interrupt request.

12. A system as claimed in claim 8, in which:

interrupt numbers are uniquely associated with said devices and said controller is arranged to respond to the number remaining on said bus at the end of said predetermined frame to select the associated device for processing of its interrupt request.

* * * * *

Disclaimer 3,818,447.—*David John Craft*, Chandlers Ford, England. PRIORITY DATA HANDLING SYSTEM AND METHOD. Patent dated June 18, 1974. Disclaimer filed Jan. 26, 1978, by the assignee, *International Business Machines Corporation, Inc.*

Hereby enters this disclaimer to claims 1 through 12 of said patent.

[*Official Gazette April 18, 1978.*]